United States Patent [19]

Kamegawa

[11] Patent Number: 5,185,038
[45] Date of Patent: Feb. 9, 1993

[54] PASTELS CONTAINING FLUORESCENT PIGMENTS AND METHOD FOR PRODUCING THE SAME

[75] Inventor: Manabu Kamegawa, Osaka, Japan

[73] Assignee: Nouvel Laboratory, Ltd., Osaka, Japan

[21] Appl. No.: 754,999

[22] Filed: Sep. 5, 1991

[30] Foreign Application Priority Data

Sep. 5, 1990 [JP] Japan ................................. 2-236118

[51] Int. Cl.$^5$ ............................................. C04B 14/00
[52] U.S. Cl. .................................... 106/416; 106/468; 106/486
[58] Field of Search ............... 106/415, 416, 468, 486, 106/19

Primary Examiner—Karl Group
Assistant Examiner—Chris Gallo
Attorney, Agent, or Firm—Wegner, Cantor, Mueller & Player

[57] ABSTRACT

There is disclosed a method for producing a pastel containing a fluorescent pigment therein by extrusion molding. The method comprises preparing a molding material composed of a mixture comprising a fluorescent pigment in an amount of 20-60% by weight, montmorillonite group minerals or clay mainly composed of montmorillonite group minerals as a first extender in an amount of 5-17% by weight, a second extender other than the first in an amount of 35-70% by weight, and a wetting agent in an amount of 0-6% by weight, based on the mixture, and water in an amount sufficient to render the molding material plastic and moldable, and extrusion-molding and drying the material.

14 Claims, No Drawings

PASTELS CONTAINING FLUORESCENT PIGMENTS AND METHOD FOR PRODUCING THE SAME

FIELD OF THE INVENTION

This invention relates to a pastel containing fluorescent pigments and a method for producing the same.

DESCRIPTION OF THE PRIOR ART

A pastel is a stick-like drawing material having a square section and is very similar to conte (registered trade mark owned by Conte, France). A pastel is composed of almost pure pigments and a small amount of extender such as clay or kaolin, so that it provides drawings having a bright color tone of a peculiar sort derived from powder pigments, unlike oil colors or water colors.

In addition, a pastel has a large degree of freedom in drawing expression. For example, it can draw fine lines with its corner, and it can also draw with its surface. Thus, pastels have been known as an indispensable drawing material for sketching. In recent years, a pastel is widely used as a general drawing or painting material on account of its diversity of expressive power.

As such a drawing material, it is necessary that pastels be manufactured with many kinds of colors, and accordingly pastels have hitherto been usually produced by extrusion molding because of high efficiency and easiness of color change in manufacturing pastels. Moreover, pastels having a different size or shape can be readily produced by extrusion molding by exchanging a nozzle through which pastels are extruded.

A pastel containing fluorescent pigments is already known as one having a further new expressive power. However, there has been known no method of producing a pastel containing fluorescent pigments therein by extrusion molding, although it has been desired.

The conventional pastel containing normal pigments (other than fluorescent pigments) contains about 60-80% by weight of extender. However, fluorescent pigments, in particular organic fluorescent pigments, contain a synthetic resin as a base material, as well known, so that it is necessary to use a larger amount of extender in order to extrude a mixture containing such fluorescent pigments. Meanwhile, a pastel containing such a large amount of extender provides no drawing having a vivid fluorescence.

DESCRIPTION OF THE INVENTION

It is therefore an object of the invention to provide a pastel containing fluorescent pigments therein and a method of producing such a pastel by extrusion molding.

According to the invention there is provided a pastel which comprises a fluorescent pigment in an amount of 20-60% by weight, montmorillonite group minerals or clay mainly composed of montmorillonite group minerals as a first extender in an amount of 5-17% by weight, a second extender other than the first in an amount of 35-70% by weight, and a wetting agent in an amount of 0-6% by weight.

Further according to the invention there is provided a method of producing such a pastel which comprises preparing a molding material composed of a mixture comprising a fluorescent pigment in an amount of 20-60% by weight, montmorillonite group minerals or clay mainly composed of montmorillonite group minerals as a first extender in an amount of 5-17% by weight, a second extender other than the first in an amount of 35-70% by weight, and a wetting agent in an amount of 0-6% by weight, based on the mixture, and water in an amount sufficient to render the molding material plastic and moldable, and extrusion-molding and drying the material.

The method of the invention employs montmorillonite group minerals or clay mainly composed of montmorillonite group minerals as a first extender so that the resultant molding material has a high plasticity or moldability notwithstanding a significant amount of fluorescent pigments contained therein, and thus the molding material can be readily extrusion-molded. The green mold thus obtained is cut to a suitable length and dried to provide a pastel containing a fluorescent pigment.

The fluorescent pigment is such a pigment as has fluorescent or brilliant color when it receives daylight or the like, and is usually available as a powder composed of a synthetic resin having a fluorescent dye dissolved therein, as well known. Such a type of fluorescent pigment is preferred in the invention, but organic fluorescent pigments which are originally insoluble in solvents may also be used.

The organic fluorescent pigment used in the invention preferably has a softening point of not less than 160° C., and is also insoluble in polyhydric compounds which are liquid at normal temperatures such as polyhydric alcohols or polyalkylene glycols as well as water. When the organic fluorescent pigment used has a softening point of less than 160° C., the resultant pastel is poorly drawable on paper since the pigment melts by frictional heat when drawing. When the pastel contains components soluble in water or such a polyhydric compound as above mentioned therein, they are deposited on the surface of the resultant mold after the molding material is molded and dried. Hence the resultant pastel is badly draws on paper.

The mixture (to be mixed with water to provide the molding material as above set forth) contains a fluorescent pigment in an amount of 20-60% by weight, preferably 25-55% by weight. When the mixture contains a fluorescent pigment in an amount more than 60% by weight, the resultant molding material is short of viscosity or plasticity so that it is difficult to extrusion-mold the material. However, when the mixture contains a fluorescent pigment in an amount less than 20% by weight, the resultant pastel provides drawings having insufficient fluorescence.

According to the invention, the mixture contains a montmorillonite group minerals or smectites, or clay mainly composed of montmorillonite group minerals as a first extender. Such a clay may be exemplified by bentonite, and bentonite is most preferred as the first extender in the invention.

The montmorillonite group mineral used includes, for example, montmorillonite, magnesian montmorillonite, iron montmorillonite, iron magnesian montmorillonite, beidellite, aluminian beidellite, nontronite, aluminian nontronite, saponite, hectorite, sauconite, with montmorillonite being most preferred.

According to the invention, the mixture contains such a first extender as above in an amount of 5-17% by weight, preferably 5-15% by weight so that the mixture can be formed into a plastic and extrusion-moldable material in spite of the fact that the mixture contains fluorescent pigments in an amount of 20-60% by weight. However, the use of the first extender in excess is not desirable since the resultant pastel fails to provide drawing having vivid fluorescence.

A second extender is used together with the first extender according to the invention. It is preferred that the second extender used has a large specific gravity and a small oil absorption. Such a second extender may be preferably barium sulfate or a mixture of barium sulfate and clay. The use of second extender provides a pastel which is fragile when drawing and which produces a smaller frictional heat when drawing so that it draws well on paper.

The second extender is used in an amount of 35–70% by weight, preferably 35–60% by weight, based on the mixture. When the second extender is used in an amount of less than 35% by weight based on the mixture, the resultant pastel badly draws on paper, whereas when the amount is more than 70% by weight based on the mixture, the resultant pastel provides no drawing having vivid fluorescence.

The pastel of the invention preferably contains an organic polyhydric compound which is liquid at normal temperatures such as ethylene glycol, propylene glycol, glycerine or polyethylene glycol as a wetting agent. The incorporation of wetting agent in the pastel of the invention reduces the cohesion of such a first extender as bentonite so that the resultant pastel draws well on paper. However, the use of wetting agent in excess reduces plasticity of the resultant molding material, and hence the wetting agent is used in an amount of 0–6% by weight, preferably 0–5% by weight, based on the mixture.

It is most preferred that the mixture is composed of 25–55% by weight of a fluorescent pigment, 5–15% by weight of montmorillonite group minerals or clay mainly composed of montmorillonite group minerals as a first extender, 40–55% by weight of second extender, and 0–5% by weight of wetting agent.

The mixture is kneaded together with water to provide a highly plastic molding material. Thus, the material is extrusion-molded, cut to a suitable length, and dried to provide pastels. In the preparation of molding material, it is preferred that water is used in an amount of 10–50 parts by weight, preferably 10–40 parts by weight, in relation to 100 parts by weight of the mixture, however, the amount of water used is not limited to the above.

After the extrusion molding and cutting to a suitable length, the resultant green mold is dried usually at low temperatures, preferably at 30°–60° C., most preferably 40°–50° C., over a period of 10–48 hours so that the mold contains substantially no water. As apparent, the pastel of the invention has substantially the same composition as the mixture used for the preparation of molding material.

As above set forth, the use of montmorillonite group minerals or clay mainly composed of montmorillonite group minerals as the first extender together with the second extender having a large specific gravity and a small oil absorption according to the invention provides a molding material with high plasticicity without the use of a large amount of extenders. Accordingly pastels can be produced by extrusion molding. The resultant pastel thus contains a relatively small amount of extender so that it provides drawing having vivid fluorescence.

The invention will now be described with reference to examples, however, the invention is not limited thereto.

EXAMPLES

In the examples, solid components (amount of each of which is indicated by % by weight) were mixed together with a kneader for 15 minutes. Then, water (amount of which is indicated in parentheses by parts by weight in relation to 100 parts by weight of the mixture, and which contains an appropriate amount of antiseptic) was added to the mixture and kneaded together for about one hour to prepare a molding material. The material was then extrusion-molded with an extruder, cut to a suitable length, and dried at 40° C. for 24 hours to provide pastels.

| | |
|---|---|
| Example 1 | |
| (Pastel having yellow fluorescent color) | |
| Day-Glo T-17[1] | 34.5 |
| Bentonite | 9.9 |
| Barium sulfate | 42.0 |
| Clay | 13.6 |
| Water | (23.4) |
| Example 2 | |
| (Pastel having reddish fluorescent color) | |
| Epocolor FP-20[2] | 45.5 |
| Bentonite | 9.0 |
| Barium sulfate | 45.5 |
| Water | (29.8) |
| Example 3 | |
| (Pastel having orange fluorescent color) | |
| Day-Glo T-14[3] | 26.7 |
| Bentonite | 9.0 |
| Barium sulfate | 48.5 |
| Clay | 15.8 |
| Water | (21.2) |
| Example 4 | |
| (Pastel containing polyethylene glycol) | |
| Epocolor FP-3000[4] | 33.7 |
| Bentonite | 9.6 |
| Barium sulfate | 39.8 |
| Clay | 14.5 |
| Polyethylene glycol | 2.4 |
| Water | (20.5) |

NOTES:
[1] Fluorescent pigment available from Bokusui-Brown, softening point of 175° C.
[2] Fluorescent pigment available from Nippon Shokubai Kogyo K.K., softening point of more than 250° C.
[3] Fluorescent pigment available from Bokusui-Brown, softening point of 175° C.
[4] Fluorescent pigment available from Nippon Shokubai Kogyo K.K., softening point of more than 250° C.
[5] Available from Daiichi Kogyo Seiyaku Kogyo K.K., molecular weight of 285–315.

What is claimed is:

1. A pastel which comprises a fluorescent pigment in an amount of 20–60% by weight, montmorillonite group minerals or clay mainly composed of montmorillonite group minerals as a first extender in an amount of 5–17% by weight, a second extender other than the first in an amount of 35–70% by weight, and a wetting agent in an amount of 0–6% by weight.

2. The pastel as claimed in claim 1 wherein the first extender is bentonite or montmorillonite.

3. The pastel as claimed in claim 1 wherein the second extender is barium sulfate or a mixture of barium sulfate and clay.

4. The pastel as claimed in claim 1 wherein the wetting agent is an organic polhydric compound which is liquid at normal temperatures.

5. The pastel as claimed in claim 4 wherein the wetting agent is polyethylene glycol.

6. The pastel as claimed in claim 1 which comprises 25-55% by weight of a fluorescent pigment, 5-15% by weight of montmorillonite group minerals or clay mainly composed of montmorillonite group minerals as the first extender, 40-55% by weight of second extender, and 0-5% by weight of wetting agent.

7. A method of producing a pastel which comprises preparing a molding material composed of a mixture comprising a fluorescent pigment in an amount of 20-60% by weight, montmorillonite group minerals or clay mainly composed of montmorillonite group minerals as a first extender in an amount of 5-17% by weight, a second extender other than the first in an amount of 35-70% by weight, and a wetting agent in an amount of 0-6% by weight, based on the mixture, and water in an amount sufficient to render the molding material plastic and moldable, and extrusion-molding and drying the material.

8. The method as claimed in claim 6 wherein the first extender is bentonite or montmorillonite.

9. The method as claimed in claim 6 wherein the second extender is barium sulfate or a mixture of barium sulfate and clay.

10. The method as claimed in claim 6 wherein the wetting agent is an organic polhydric compound which is liquid at normal temperatures.

11. The method as claimed in claim 10 wherein the wetting agent is polyethylene glycol.

12. The method as claimed in claim 6 wherein the mixture comprises 25-55% by weight of a fluorescent pigment, 5-15% by weight of montmorillonite group minerals or clay mainly composed of montmorillonite group minerals as the first extender, 40-55% by weight of second extender, and 0-5% by weight of wetting agent.

13. The method as claimed in claim 6 wherein the water is used in an amount of 10-50 parts by weight in relation to 100 parts by weight of the mixture.

14. The method as claimed in claim 6 wherein the molding material is extrusion-molded, cut to a suitable length and dried at 30°-60° C.

* * * * *